Dec. 1, 1970 T. T. FJÄLLBRANT 3,544,924

VARIABLE DELAY ARRANGEMENT IN A LADDER NETWORK USING SIGNALS RELATED TO THE INPUT FED TO THE SHUNT ELEMENTS TO AFFECT THE POLES AND ZEROES OF THE TRANSFER FUNCTION

Filed Sept. 25, 1968 2 Sheets-Sheet 1

INVENTOR

TORE TORSTENSSON FJÄLLBRANT

BY Hane and Baxley

ATTORNEYS

Dec. 1, 1970 T. T. FJÄLLBRANT 3,544,924

VARIABLE DELAY ARRANGEMENT IN A LADDER NETWORK USING SIGNALS RELATED TO THE INPUT FED TO THE SHUNT ELEMENTS TO AFFECT THE POLES AND ZEROES OF THE TRANSFER FUNCTION

Filed Sept. 25, 1968 2 Sheets-Sheet 2

INVENTOR

Tore Torstensson Fjällbrant

BY Hane and Baxley

ATTORNEYS 3,544,924

VARIABLE DELAY ARRANGEMENT IN A LADDER NETWORK USING SIGNALS RELATED TO THE INPUT FED TO THE SHUNT ELEMENTS TO AFFECT THE POLES AND ZEROES OF THE TRANSFER FUNCTION

Tore Torstensson Fjällbrant, Fjaras, Sweden, assignor to Telefonaktiebolaget L M Ericsson, Stockholm, Sweden, a corporation of Sweden Filed Sept. 25, 1968, Ser. No. 762,545
Claims priority, application Sweden, Oct. 9, 1967, 13,777/67
Int. Cl. H03h *7/36, 7/14*
U.S. Cl. 333—29 8 Claims

ABSTRACT OF THE DISCLOSURE

A signal delay device comprises a plurality of serially connected impedance links to form a ladder network. Each impedance link includes a series impedance and a shunt impedance. One end of the ladder network is the input of the device while the other end is the output. When signals are fed to the input of the device, signals related thereto are fed to the shunt elements to affect the poles and zeroes of the transfer function of the ladder network.

The present invention relates to a delay circuit or arrangement which, despite its simple structure, has a large maximum delay which can be successively reduced down to a zero value.

Earlier known delay arrangements are normally built up as ladder networks of inductances and capacitances with the inductances in the series branches and the capacitances in the shunt branches. The delay in these arrangements can be made variable either by using capacitances which are formed as variable capacitance-diodes or by using inductances which are formed as coils wound around a magnetic material, the magnetic qualities of which are electrically controlled. In this way a variation can be obtained in the delay of about 5–10% around an average value.

With a delay arrangement according to the invention, formed for example by means of inductance-capacitance links, there is obtained a maximum delay that is equal to twice the delay that has previously been obtained with the inductance-capacitance or LC-links in a normal connection, and a possibility of varying this delay electrically down to a zero delay.

Figure 1:
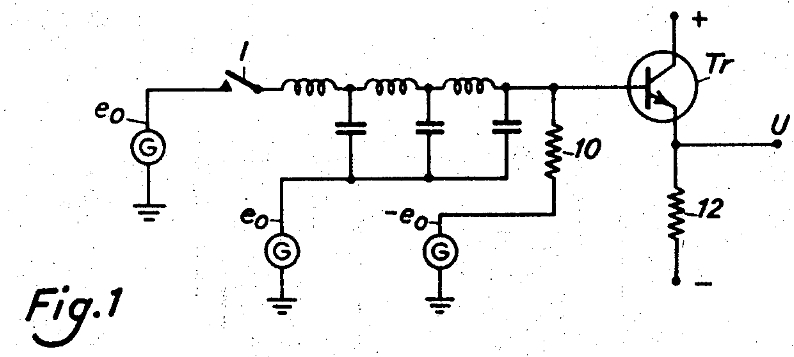
Figure 2:
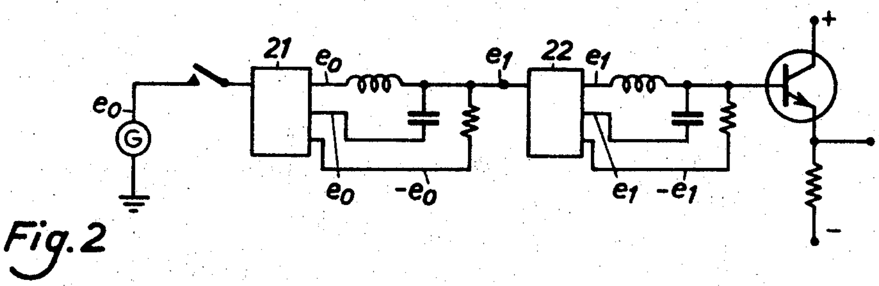
Figure 3:
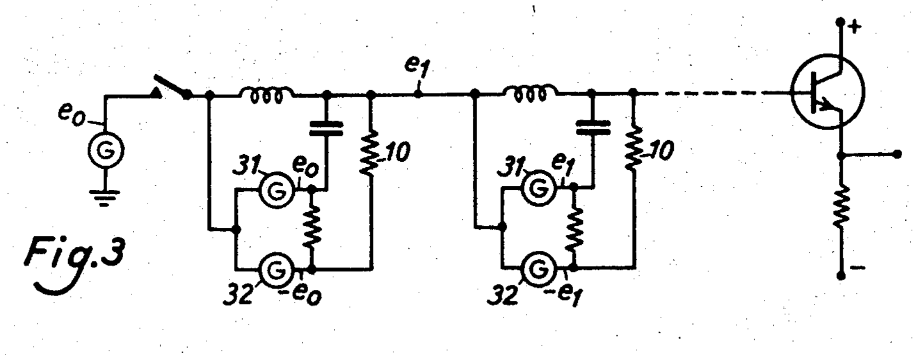
Figure 4:
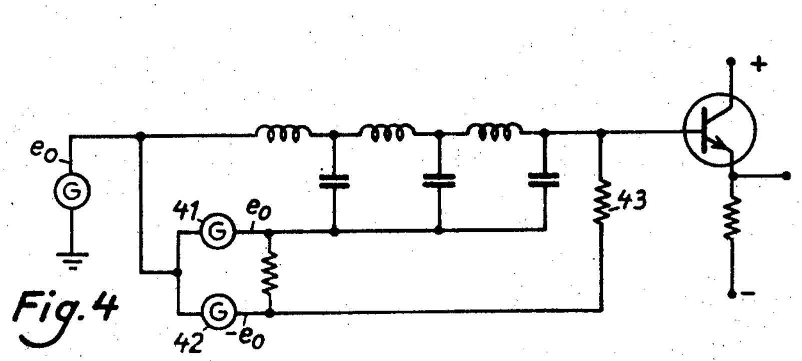
Figure 5:
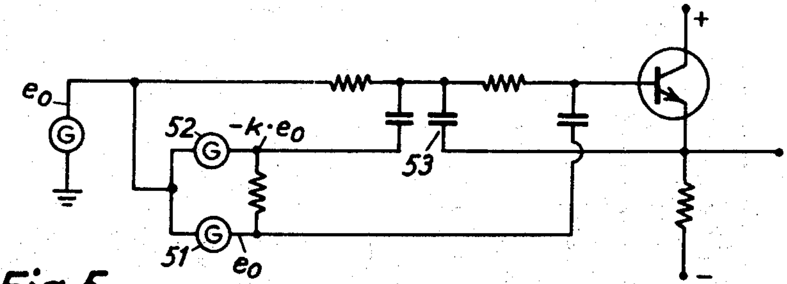
Figure 6:
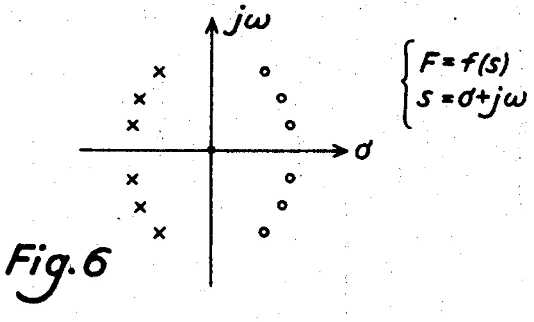
Figure 7:
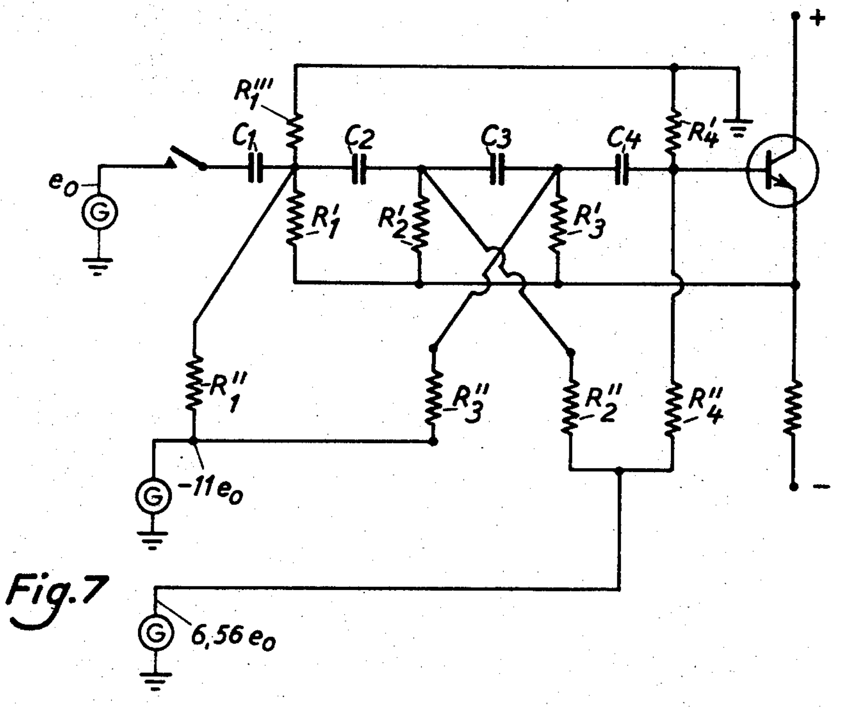

The invention will be more fully described in connection with the accompanying drawing, where FIG. 1 shows a delay arrangement consisting of LC-links, the transfer function F of the delay arrangement having transmission zeroes symmetrically placed in the right half of the complex frequency plane, FIG. 2 shows a somewhat modified delay arrangement with two separate and resistively terminated LC-links, FIG. 3 shows a modification of the arrangement according to FIG. 2 with a separate, variable signal feeding the LC-links, FIG. 4 shows a modification of the arrangement according to FIG. 1 with a common, variable signal feeding the LC-links, FIG. 5 shows a delay arrangement with RC-links and a common variable signal feeding to the RC-links, and FIG. 6 shows transmission poles and transmission zeroes plotted in the complex frequency plane and FIG. 7, finally, shows an arrangement with RC-links.

The delay arrangement according to FIG. 1 comprises a ladder network with three LC-links, the inductances being included as series elements and the capacitances as shunt elements. The ladder network is connected to a signal source $e_0$ on the input side I, the signals from the signal source being transmitted, via the ladder network and a buffer network, with a certain delay from the output side U. The buffer network is a transistor T*r*, the base of which is connected to the ladder network, the collector of which is connected to a positive voltage source and the emitter of which is connected partly via a resistance 12, to a negative voltage source, and partly to the output side U. The lower terminals of the shunt elements as shown in FIG. 1 are connected to each other and to a low impedance signal source $e_0$. The output terminal of the ladder network is, via a terminating resistance 10, connected to a low impedance source $-e_0$. Thus both a signal of the same magnitude and polarity as the input signal, and a signal of the same magnitude as the input signal but of reverse polarity are connected to the ladder network. Accordingly the transfer function of the delay arrangement will have transmission zeroes (the roots of the numerator polynomial) that are symmetrically placed in the right half of the complex frequency plane, see FIG. 6. In that figure the transmission poles (the roots of the denominator polynominal) are denoted by crosses (×), and the transmission zeroes by circles (○). It is known that the delay of a delay arrangement is equal to the derivative of the phase function and increases with the number of transmission poles. As the transmission zeroes in the present case give the same contribution to the phase function as the transmission poles, a doubling of the delay is obtained with the described arrangement. The result will be the same if, as in FIG. 2, each pair of transmission poles will be realized separately as a resistively terminated LC-link with buffer networks, e.g., network 22, between the links. In FIG. 1 as well as in FIG. 2 the number of links can of course be increased.

The delay arrangement according to FIG. 3 has a signal fed to each link from a low impedance signal source 31, connected to the shunt capacitor, and a high impedance signal source 32 connected to the terminating resistance 10. The signal sources 31 and 32 can be controlled so that their output signals can be reduced continuously from a nominal (maximum) value to a zero value. Hereby the corresponding transmission zeroes (see FIG. 6) will move parallel to the imaginary axis in the complex frequency plane to infinity, which means, that the delay of the arrangement in the end position is determined only by the transmission poles. If then the low impedance signal source 31 is controlled so that its output signal is continously increased, the capacitance as well as the resistance 10 in the same link will be fed with the same signal and the transmission zeroes will move in the left half of the complex frequency plane from infinity until they coincide with the transmission poles at the moment when the signal to the shunt element is just as large as the input signal of the link. The transfer function F then has the value 1 and the delay is equal to zero. In this way it is thus possible to vary the delay continuously from a maximum (nominal) value to a zero value. A pulse which is fed to the delay arrangement will then appear on the output side U of the arrangement with a delay determined by the signal to the shunt element.

The delay arrangement according to FIG. 4 includes a ladder network with three LC-circuits without intermediate buffer networks but with a common signal feeding arrangement comprising a low impedance signal source 41 and a high impedance signal source 42 for the feeding of signals to the shunt capacitances and the terminating resistance 43. For a similar variation of the signals from the signal sources some of the transmission zeroes of the transfer function will move radially towards infinity while other transmission zeroes pass the imaginary axis and go to infinity in the other half of the frequency plane. In such a case when a pulse is applied to the input of the delay arrangement three pulses are obtained, at the output of which one corresponds to maximum delay, one corresponds to half the maximum delay and one coincides with the input signal. When the signals from the high impedance and the low impedance signal sources are varied in the way mentioned, at first only the maximally delayed pulse occurs on the output side, the amplitude of which is reduced while a pulse with half the maximum delay increases and reaches the full value when the transmission zeroes are at infinity. This pulse is then reduced while a pulse without delay is increased and reaches the full value when the transmission zeroes and the transmission poles coincide. If the total delay is shorter than the width of the pulse, the pulse will be reduced on one flank during the signal variation, while a corresponding part is increasing on the other flank so that the pulse is displaced. Two different types of variable delay can thus be obtained.

The delay arrangement according to FIG. 5 comprises two RC-links and has a signal feeding arrangement similar to the one shown in FIG. 4. A positive signal from the low impedance signal source 51 and a negative signal from the high impedance signal source 52 are fed to one shunt capacitor each in the ladder network. By means of these signals the delay can be continuously varied from a maximum value to zero value. A capacitor 53, connected between the connecting point of the links and a point on the output side of the buffer network, makes possible the realization of complex transmission poles without the use of inductances. The advantage of delay arrangements with RC-links in comparison with those with LC-links is that they can be made very small using integrated circuitry.

As an example of the dimensioning of a delay arrangement according to the invention, data for at least one ladder network included in the arrangement according to FIG. 1 will be given, the number of links having however been increased to four. The magnitude of the inductances will be, counted from the left to the right: 237$\mu$h., 132$\mu$h., 90.3$\mu$h., and 41.2$\mu$h. The magnitude of the capacitances will be, in the same order: 161 pf., 111 pf., 66.9 pf. and 13.9 pf. The terminating resistance 10 is 1000Ω.

In the embodiments shown in FIGS. 1–4 signals are fed to the respective links, the signals for maximum delay having the same absolute value as the signal fed to the link and being phase shifted by 180° in relation to each other. In certain types of ladder networks another relation between the signals is required, which is stated in FIG. 5, where the signal source 51 emits the voltage $e_0$ and the signal source 52 emits the voltage $-k \cdot e_0$. In the delay arrangement according to FIG. 7 the R- and C-components have the following values.

| | |
|---|---|
| $C_1$=795 pf. | $R_4'$=12.95KΩ |
| $C_2$=287 pf. | $R_1''$=103Ω |
| $C_3$=194 pf. | $R_2''$=134.5Ω |
| $C_4$=229 pf. | $R_3''$=2.76KΩ |
| $R_1'$=18.7Ω | $R_4''$=2.33KΩ |
| $R_2'$=342Ω | $R_1'''$=27.4Ω |
| $R_3'$=103.5Ω | |

I claim:

1. A signal delay arrangement comprising a ladder network, said ladder network including a plurality of serially connected impedance links, each of said impedance links including a series impedance element having two ends and a shunt impedance element having two ends, said series impedance elements being serially connected, the free end of the series impedance element at one end of said serially connected series impedance elements being the input terminal of said signal delay arrangement, said input terminal being adapted to receive an input signal, the free end of the series impedance element at the other end of said serially connected impedance elements being the output terminal of said signal delay arrangement, each of said shunt impedance elements having one end connected to the end of its associated series impedance element remote from the input terminal of the signal delay arrangement, at least two signal sources having output terminals for generating signals related to the input signal, the generated signals having mutually opposite polarities, means for connecting the output terminal of one of said signal sources to the other end of at least one of said shunt impedance elements, and means for connecting the output terminal of the other of said signal sources to the end, remote from said input terminal, of at least one of said series impedance elements.

2. The signal delay arrangement of claim 1 wherein the output terminal of said one signal source is connected to the other end of each of said shunt impedance elements and the output terminal of said other signal source is connected to the end of said series impedance element which is the output terminal of said signal delay arrangement.

3. The signal delay arrangement according to claim 1 wherein said signal sources generate controllably variable signals, one of said signal sources has a relatively low output impedance and generates a signal of the same polarity and an input signal, and the other of said signal sources has a relatively high output impedance.

4. The signal delay arrangement according to claim 3 wherein said series impedance elements are inductors and said shunt impedance elements are capacitors, and wherein the output terminal of said one signal source is connected to said capacitors, and further comprising a resistor for connecting the output terminal of said other signal source to the output terminal of the signal delay arrangement.

5. The delay arrangement of claim 3 wherein said series impedance elements are resistors and said shunt impedance elements are capacitors, and wherein the output terminal of said other signal source is connected to the other end of the capacitor of the impedance link adjacent the input terminal of the signal delay arrangement and the output terminal of said one signal source is connected to the other end of another of said capacitors.

6. The delay arrangement of claim 3 wherein said series impedance elements are capacitors and said shunt impedance elements are resistors, and wherein the output terminals of said signal sources are connected to the other ends of at least two of said resistors.

7. The delay arrangement of claim 1 comprising at least two impedance links wherein the series impedance elements are inductors and the shunt impedance elements are capacitors, buffer means serially interconnecting said impedance links, a first signal source having first and second output terminals for transmitting signals of opposite polarity, means for connecting one of the output terminals of said first signal source to the other end of the capacitor of one of said impedance links, first resistor means for connecting the other output terminal of said first signal source to the junction of the inductor and the capacitor of said one impedance link, a second signal source having first and second output terminals of opposite polarity, means for connecting one of the output terminals of said second signal source to the other end of the capacitor of the other of said impedance links, and second resistor means for connecting the other output terminal of said second signal source to the inductor and capacitor of the other of said impedance links.

8. The signal delay arrangement of claim 1 wherein each of said impedance links includes a series impedance element having two ends and two shunt impedance elements, each of said two shunt impedance elements having two ends, one end of each of said two shunt impedance elements being connected to the end of its associated series impedance element remote from the input terminal of the signal delay arrangement, the other end of one of said two shunt impedance elements being connected to the output terminal of one of said signal sources, and the other end of the other of said two impedance elements being connected to the output terminal of the other of said signal sources.

References Cited

Fjallbrant, Tore, "On The Use of Active and Nonreciprocal Elements in Network Theory," Ericsson Technics #2, 1967, pp. 182–195.

HERMAN KARL SAALBACH, Primary Examiner

W. H. PUNTER, Assistant Examiner

U.S. Cl. X.R.

333—28, 70